United States Patent [19]

Bistrick et al.

[11] 4,111,586

[45] Sep. 5, 1978

[54] BROACH

[75] Inventors: Eugene J. Bistrick, Warren; Stewart F. Miller, Mt. Clemens; Axel B. Abrahamsson, Warren; Richard A. Schlaf, Sterling Heights, all of Mich.

[73] Assignee: Lear Siegler, Inc., Santa Monica, Calif.

[21] Appl. No.: 810,993

[22] Filed: Jun. 29, 1977

[51] Int. Cl.² .............................................. B26D 1/00
[52] U.S. Cl. ..................................................... 407/16
[58] Field of Search ............................ 407/13, 15, 16

[56] References Cited

U.S. PATENT DOCUMENTS

| 2,987,801 | 6/1961 | Psenka ................................. 407/16 |
| 3,439,398 | 4/1969 | Zawacki et al. ..................... 407/16 |

*Primary Examiner*—Harrison L. Hinson
*Attorney, Agent, or Firm*—Whittemore, Hulbert & Belknap

[57] ABSTRACT

A tension broach comprising a drawbar, a roughing shell on said bar, a finishing shell on said drawbar, said drawbar supporting said roughing shell against axial movement and limiting rotational movement thereon, said drawbar supporting said finishing shell against axial movement, and means for locating said finishing shell in angular alignment with said roughing shell with provision for slight angular movement.

8 Claims, 7 Drawing Figures

BROACH

BRIEF SUMMARY OF THE INVENTION

The present invention is concerned primarily with the manufacture of relatively large broaches. For example, the particular example illustrated and described herein has an overall length of about 9 feet, and is dimensioned to broach teeth having a diameter (root to root) of nearly seven inches.

The usual practice in the past has been to form such broaches from a single tubular broach bar with detachable ends. There has always been a possibility of breakage in heat treating and/or straightening such broaches. Tooth breakage in use has required replacement of the entire broach bar. Since this broach also required that it be formed in its entirety from the cutting steel required for efficient cutting action, the replacement cost of such a broach was very large. Also, the broach design utilizing a broach bar with detachable ends presents many manufacturing problems because of the alignment and fit of the loose ends.

In accordance with the present invention, a broach assembly comprises a drawbar which is a solid bar of high speed steel, such as M-Z. On the leading end of the assembly, a roughing shell is sleeved over the drawbar with its trailing end abutted against a support surface formed on the drawbar. In addition, flats are formed on the drawbar engaged by tangs on the roughing shell to prevent rotation of the roughing shell on the drawbar.

A finishing shell, which as disclosed herein is a side shaving shell of the type disclosed in prior U.S. Pat. No. 3,217,383, assigned to assignee herein, is sleeved on the trailing end of the drawbar and is keyed or otherwise connected to the drawbar or roughing shell so as to maintain longitudinally extending series of teeth on said shells in alignment. At the same time, limited angular movement of the finishing shell is provided for, to permit the finishing shell to float into precisely located position in which its teeth are centered in tooth spaces previously formed by the teeth of said roughing shell.

Preferably outwardly facing locating flats are formed on an enlargement of the drawbar on which the finishing shell is located. The roughing shell has a pair of axially extending tangs with confronting flat surfaces engaging the flats on the drawbar, and in addition have transversely extending flat end surfaces engageable by similarly located flat confronting surfaces provided at the forward end of the finishing shell by forming a transversely extending slot therein.

DETAILED DESCRIPTION

Figure 1:
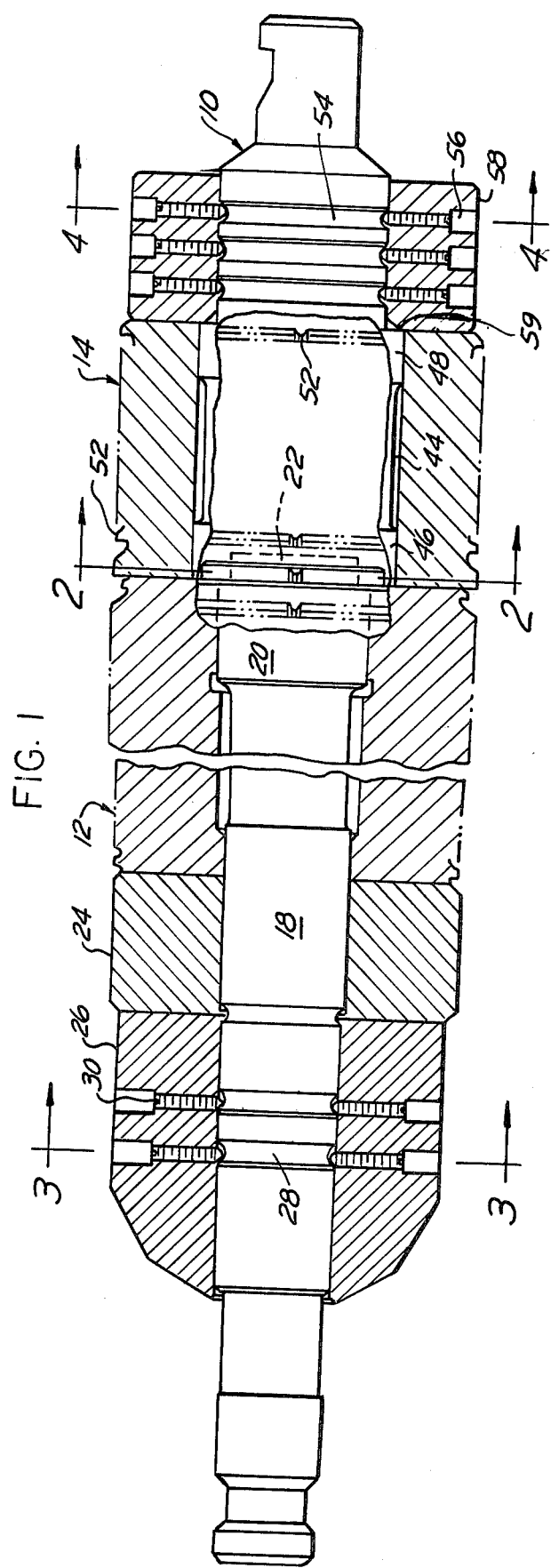
FIG. 1 is an elevational view of the broach, partly in section.
Figure 2:
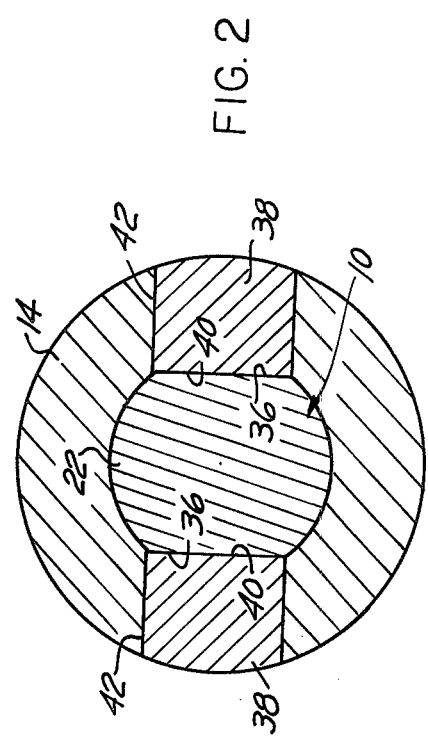
FIG. 2 is a section on the line 2—2, FIG. 1.
Figure 3:
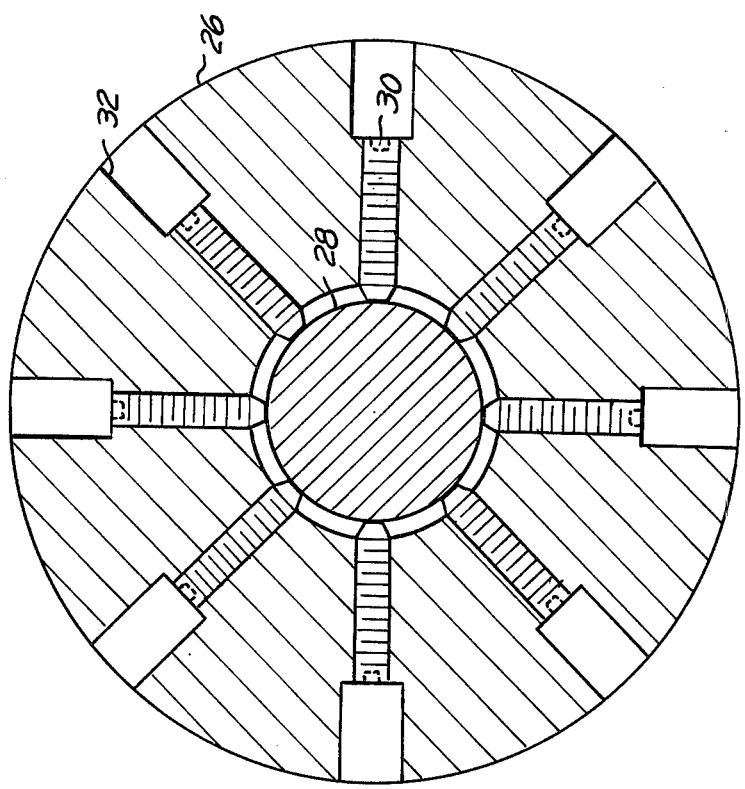
FIGS. 3 and 4 are sectional views on lines 3—3 and 4—4, FIG. 1, respectively.

Referring now to the drawings, the broach assembly comprises a solid unitary drawbar 10, a leading roughing shell 12, and a trailing finishing shell 14.

The drawbar has a pull head 16 for connection to a power device such as a hydraulic piston and cylinder (not shown) and at the other end is suitably formed for connection to a retriever.

At the zone occupied by the elongated roughing shell, the drawbar has accurately finished cylindrical locating surfaces 18 and 20. Following these is a flat radial abutment surface 22 against which the front roughing shell 12 seats. Forward of shell 12 is a pilot 24 mounted on cylindrical drawbar section 18, and forwardly of pilot 24 is a front pilot lock nut 26.

The drawbar 10 has a plurality, here illustrated as two annular grooves 28, and the lock nut 26 has a multiplicity of radially extending clamp screws 30 received in countersunk openings 32. Screws 30 have angular ends shaped to cooperate with grooves 28 so as to bias the nut 26 to the right as seen in FIG. 1. The parts are dimensioned so that when front shell 12 is seated on abutment surface 22, the inner ends of the screws 30 bear against the inclined forward, rearwardly facing sides of grooves 28.

Figure 5:
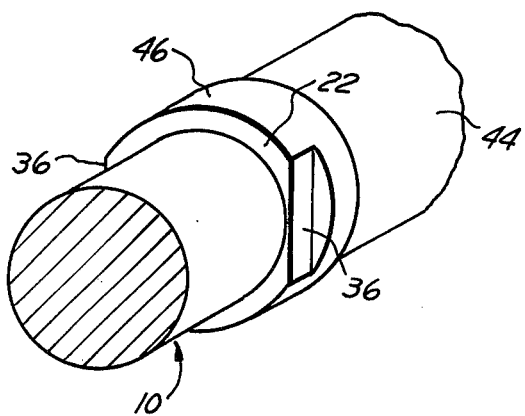
FIGS. 5, 6 and 7 are fragmentary diagrammatic perspective views showing interlock structure on the drawbar, roughing shell, and finishing shell, respectively.

Rearwardly of radially abutment surface 22, the drawbar has a generally cylindrical enlarged portion 34 which is cut away to form flat parallel outwardly facing surfaces 36, as best seen in FIG. 5. The rear end of the roughing shell 12 is provided with a pair of rearwardly projecting tangs 38 provided with confronting flat parallel surfaces 40 which locate against surfaces 36. In addition, tangs 38 have flat abutment surfaces 42 for a purpose which will presently appear.

Figure 7:
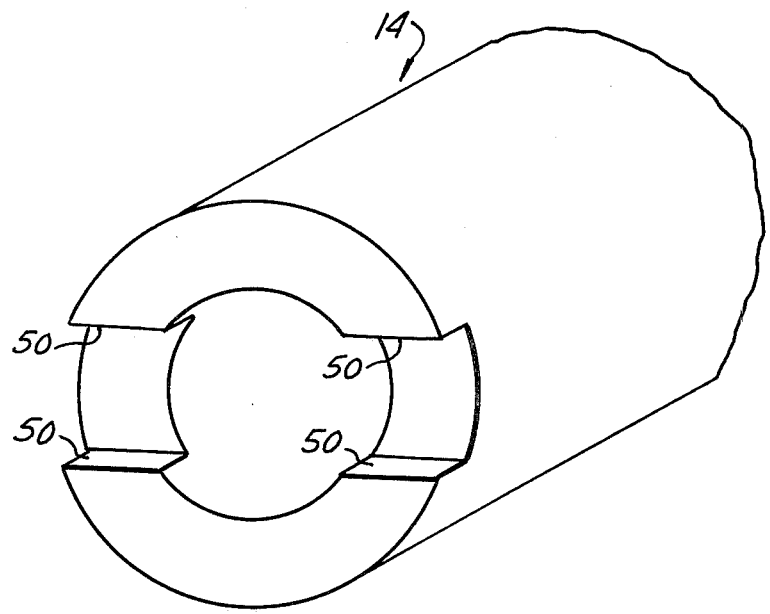

The enlargement 34 of the drawbar 10 receives the finishing shell 14, and for this purpose is relieved as indicated at 44 leaving accurately finished cylindrical locating surfaces 46, 48. Finishing shell 14, as best seen in FIG. 7, has a transverse slot forming flat locating surfaces 50 which cooperate with surfaces 42 on tangs 38 to limit rotation of the finishing shell 14 relative to the roughing shell 12. Surfaces 42 and 50 are formed to provide a very slight rotation of the finishing shell 14 relative to the roughing shell 12. This may amount to about .005 or .006 inches of circumferential movement at the pitch diameter, just enough to insure that finishing shell 14 may float into true registration with the teeth and tooth slots cut on a work blank by the roughing shell.

Figure 4:
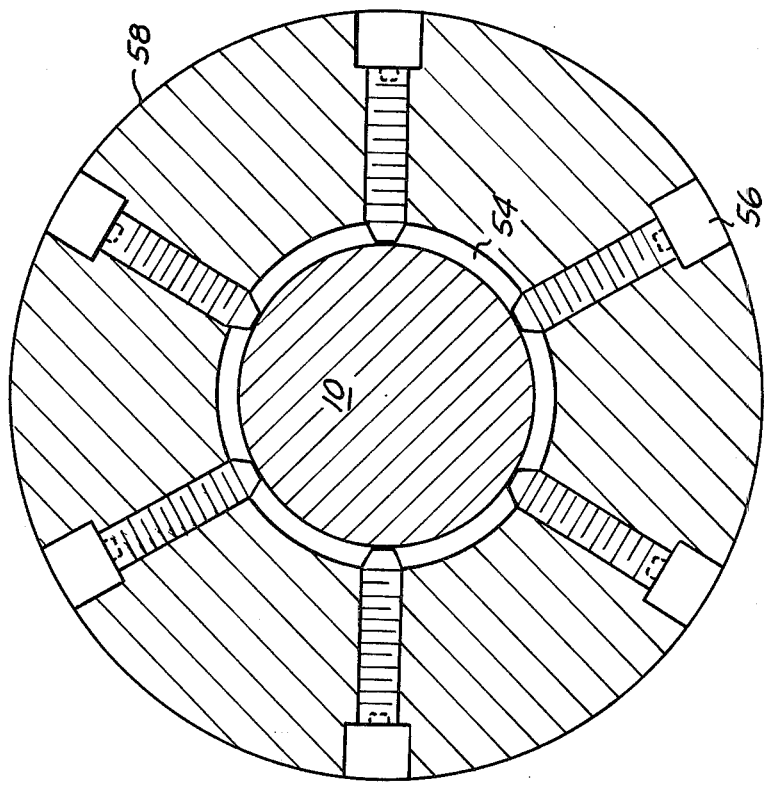

The finishing shell 14 has cutting teeth 52 of increasing width to take finishing cuts throughout substantially the full depth of tooth spaces. In order to support the finishing shell on the drawbar, the trailing end of the drawbar has a plurality (here illustrated as three) of grooves 54 which receive the inner ends of radially extending lock screws 56 countersunk in rear lock nut 58 as best seen in FIGS. 1 and 4. Here the screws 56 have generally conical ends and engage the inclined rear walls of grooves 54, biasing nut 58 forwardly against an annular, rearwardly facing shoulder 59 on the drawbar and cause rear lock nut to constitute a fixed, rigid abutment supporting the finishing shell to carry out its cutting operation.

Where the number of teeth being cut is odd, recesses providing locating surfaces 50 and tangs 38 are slightly offcenter to insure that the two cutting shells can only be assembled in proper relation ro assure substantial alignment of cutting teeth therein.

Figure 6:
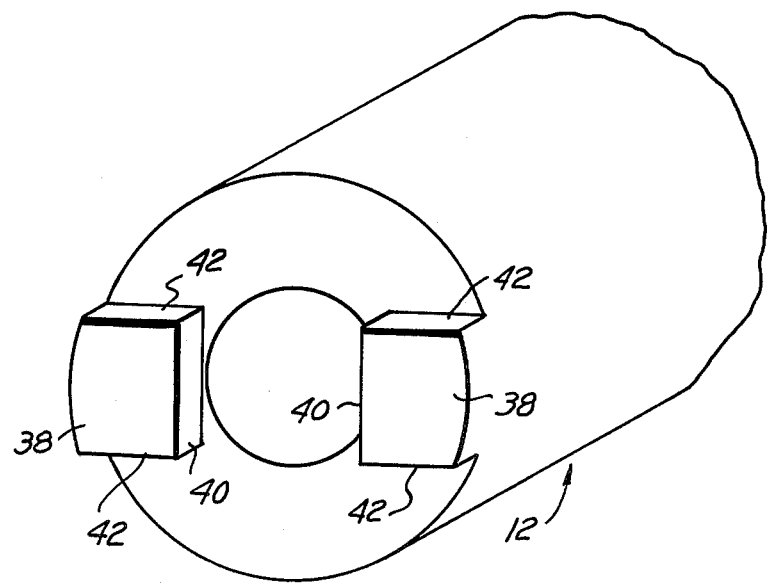

While FIGS. 6 and 7 suggest that the tangs 38 and the slot which forms flats 50 may be integral with shells 12 and 14, it will of course be understood that one or both of these constructions may be separately machined and secured to the appropriate shell by bolts or the like.

Where reference is made to longitudinally extending series of teeth, it will be understood that these series are parallel to the axis of the drawbar for cutting spur teeth, and helically arranged for cutting helical teeth.

The specific broach design described herein utilizes a single piece roughing body or shell and a separate side shaving shell. However, it is to be understood that the roughing body may be made up of two or more short sections in conjunction with a side shaving finishing shell, mounted on the drawbar.

What we claim as our invention is:

1. A tension broach comprising an elongated drawbar having a first cylindrical locating surface adjacent its forward end and a flat forwardly facing annular abutment surface at the trailing end of said first locating surface, a tubular roughing shell on said drawbar having a multiplicity of series of longitudinally aligned rough cutting teeth, said roughing shell having a cylindrical internal surface fitting said first locating surface and a flat, rear, annular abutment surface engaging the abutment surface on said drawbar, said drawbar having a second enlarged cylindrical locating surface extending rearwardly from the abutment surface on said drawbar, a tubular finishing shell on the second enlarged cylindrical locating surface of said drawbar having an internal cylindrical surface fitting said second locating surface on said drawbar and having a multiplicity of finish cutting teeth in longitudinal alignment with said rough cutting teeth, and abutment means on said drawbar having a forwardly facing flat annular abutment surface, said finishing shell at its rear end having a flat annular abutment surface engaging the abutment surface of said abutment means.

2. A broach as defined in claim 1, comprising interfitting means at the adjacent ends of said shells providing for limited angular movement of said finishing shell to maintain the longitudinally extending series of teeth thereon in alignment with the longitudially aligned series of teeth on said roughing shell.

3. A broach as defined in claim 1, in which said abutment means comprises an annular member having a multiplicity of radial set screws extending through said member, said drawbar having a plurality of circular grooves having inclined sides, in which the inner ends of said screws are tapered to lock said member in assembled position against a rearwardly facing shoulder on said drawbar.

4. A broach as defined in claim 3, in which the forward end of said annular member locates the forward end of said finishing shell with slight clearance with the rear end of said roughing shell to allow angular movement of said finishing shell.

5. A broach as defined in claim 2, in which said abutment means comprises an annular member having a multiplicity of radial set screws extending through said member, said drawbar having a plurality of circular grooves having inclined sides, in which the inner ends of said screws are tapered to lock said member in assembled position against a rearwardly facing shoulder on said drawbar, in which the forward end of said annular member locates the forward end of said finishing shell with slight clearance with the rear end of said roughing shell to allow angular movement of said finishing shell as permitted by said interfitting means.

6. A broach as defined in claim 1, which comprises an annular front locking member located forwardly of said roughing shell on said drawbar, said drawbar having a front cylindrical locating surface on which said locking member is sleeved, said front locating surface having a plurality of grooves the forward sides of which are inclined inwardly and rearwardly, said locking member having a plurality of radial screws the inner ends of which are tapered and engage the inclined forward sides of said grooves when tightened and urge said locking member rearwardly to clamp said roughing shell against the forwardly facing abutment surface on said drawbar at the trailing end of said first cylindrical locating surface.

7. A broach as defined in claim 1, in which said drawbar has outwardly facing flat surfaces at the forward end of said second enlarged cylindrical locating surface, said roughing shell having at its rear end a pair of rearwardly projecting tangs having flat inner surfaces spaced to engage the outwardly facing flat surfaces on said drawbar and having in addition flat end surfaces, said finishing shell having a transverse slot at its forward end having flat locating surfaces engageable with the flat end surfaces of said tangs to limit rotation of said finishing shell relative to said roughing shell.

8. A broach as defined in claim 7, the flat end surfaces of the tangs and the flat locating surfaces in the slot at the forward end of said finishing shell being dimensioned to provide very limited angular movement of said finishing shell relative to said roughing shell to ensure registration of the cutting teeth at the forward end of said finishing shell with tooth spaces cut by the teeth of said roughing shell, and to thereafter float into precise registration therewith.

* * * * *